United States Patent [19]
Britton

[11] Patent Number: 5,737,847
[45] Date of Patent: Apr. 14, 1998

[54] TELESCOPING STAND WITH PIVOTABLE HOLDER FOR A HAND-HELD HAIR DRYER

[76] Inventor: Doris Britton, 3033 Maple Ave., Altoona, Pa. 16601

[21] Appl. No.: 800,451

[22] Filed: Feb. 18, 1997

[51] Int. Cl.⁶ .................................................. A45D 20/14
[52] U.S. Cl. .................................................. 34/97
[58] Field of Search ........................... 34/90, 91, 96, 34/97, 98; 239/587.4, 587.5; 132/7, 9

[56] References Cited

U.S. PATENT DOCUMENTS

| | | | |
|---|---|---|---|
| 5,064,154 | 11/1991 | Payne | 248/121 |
| 5,350,144 | 9/1994 | Lary | 248/183 |
| 5,613,305 | 3/1997 | Narrin | 34/90 |
| 5,636,815 | 6/1997 | Wilson | 248/125.9 |

*Primary Examiner*—Henry A. Bennett
*Assistant Examiner*—Pamela A. O'Connor

[57] ABSTRACT

A telescoping stand with pivotable holder for a hand-held hair dryer including a stand having a base and a manually and telescopically adjustable pole extending therefrom and terminated at a free end; and a coupling mechanism secured to the free end of the pole for removably holding a hand-held hair dryer and allowing it to be positioned at different angles for use.

2 Claims, 3 Drawing Sheets

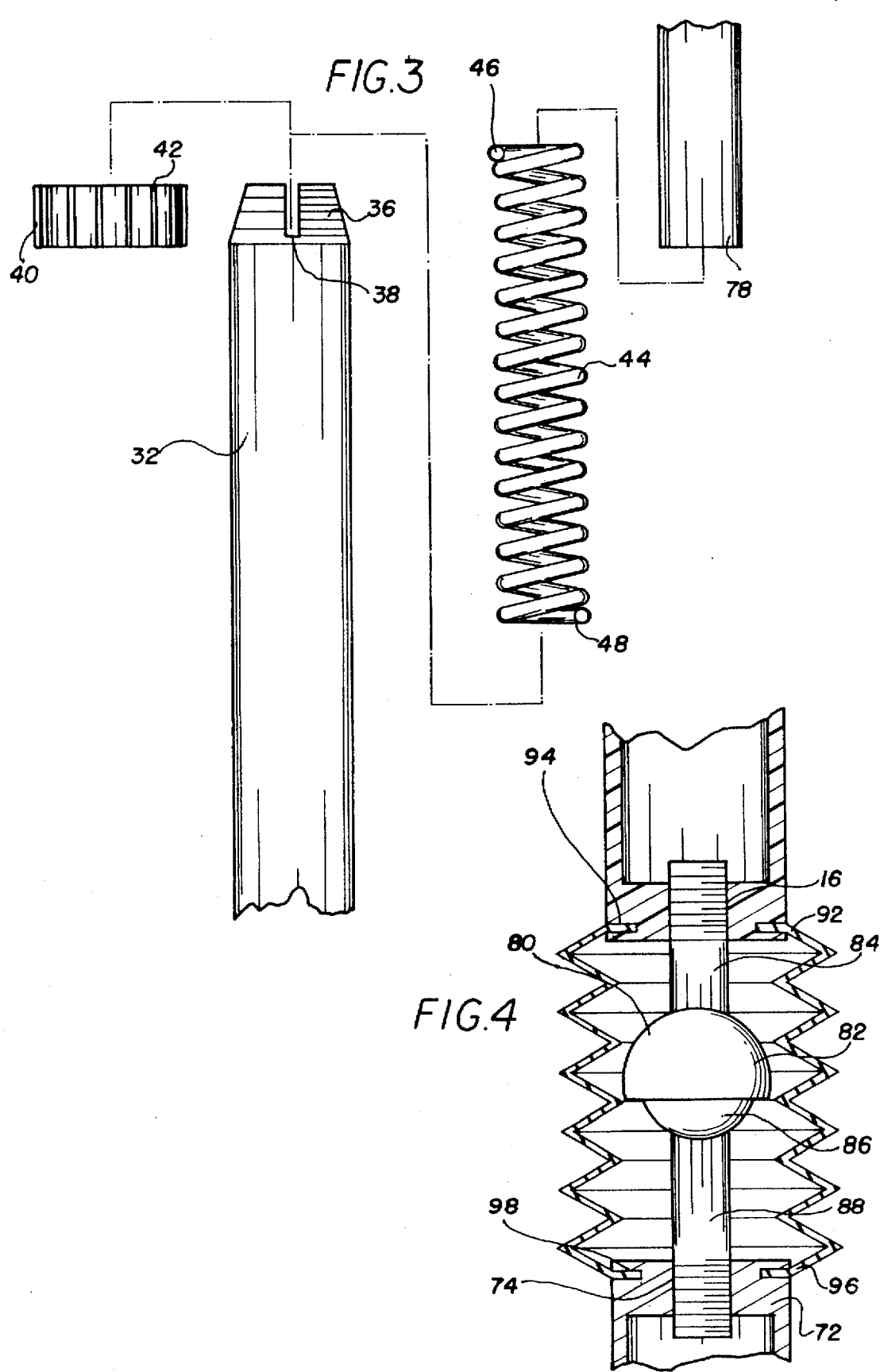

5,737,847

TELESCOPING STAND WITH PIVOTABLE HOLDER FOR A HAND-HELD HAIR DRYER

BACKGROUND OF THE INVENTION

1. Field of the Invention

The present invention relates to a telescoping stand with pivotable holder for a hand-held hair dryer and more particularly pertains to holding a hand-held hair dryer at a elevation and angle that allows for optimal drying of a person's hair with a telescoping stand with pivotable holder for a hand-held hair dryer.

2. Description of the Prior Art

The use of hair drying stands is known in the prior art. More specifically, hair drying stands heretofore devised and utilized for the purpose of drying hair are known to consist basically of familiar, expected and obvious structural configurations, notwithstanding the myriad of designs encompassed by the crowded prior art which have been developed for the fulfillment of countless objectives and requirements.

By way of example, U.S. Pat. Des. 253,305 to Battaglia discloses a combined hair dryer and stand. U.S. Pat. Des. 329,507 to Assmann discloses a hair dryer stand. U.S. Pat. No. 4,466,203 to Thomas discloses a stand for a hand-held hair dryer. U.S. Pat. No. 5,064,154 to Payne discloses a stand and holder for a hair dryer. U.S. Pat. No. 5,359,461 to Rice et al. discloses a portable cosmetic mirror apparatus. U.S. Pat. No. 5,435,696 to Cunning discloses a tiltable oscillating fan assembly.

While these devices fulfill their respective, particular objective and requirements, the aforementioned patents do not describe a telescoping stand with pivotable holder for a hand-held hair dryer that allows the angle and elevation of a hair dryer to be manually set by a person for drying his or her hair.

In this respect, the telescoping stand with pivotable holder for a hand-held hair dryer according to the present invention substantially departs from the conventional concepts and designs of the prior art, and in doing so provides an apparatus primarily developed for the purpose of holding a hand-held hair dryer at a elevation and angle that allows for optimal drying of a person's hair.

Therefore, it can be appreciated that there exists a continuing need for new and improved telescoping stand with pivotable holder for a hand-held hair dryer which can be used for holding a hand-held hair dryer at a elevation and angle that allows for optimal drying of a person's hair. In this regard, the present invention substantially fulfills this need.

SUMMARY OF THE INVENTION

In the view of the foregoing disadvantages inherent in the known types of hair drying stands now present in the prior art, the present invention provides an improved telescoping stand with pivotable holder for a hand-held hair dryer. As such, the general purpose of the present invention, which will be described subsequently in greater detail, is to provide a new and improved telescoping stand with pivotable holder for a hand-held hair dryer and method which has all the advantages of the prior art and none of the disadvantages.

To attain this, the present invention essentially comprises, in combination, a hand-held hair dryer. The hair dryer has a handle with a threaded bore formed thereon, an output nozzle, and an electrical blower-heater assembly mechanism therebetween for discharging heated air through the output nozzle for drying hair when it is electrically actuated.

A stand is included. The stand is formed of a tubular upwardly extending sleeve having a central axis, a closed lower end, a threaded open end with a slot formed thereon and a nut threadably secured therearound whereby tightening the nut decreases the diameter of the open end. An elongated helical spring is included and has an upper end and a lower end and with the spring inserted within the sleeve and in axial alignment therewith such that the lower end of the spring is placed in contact with the lower end of the sleeve. A rigid base is included and coupled to the lower end of the stand. The base is formed of four elongated legs extending radially outwards from the sleeve. Each leg is generally positioned at an angle perpendicular to the adjacent legs. The legs are terminated at free ends contained in a common plane that is positioned substantially perpendicular to the central axis of the sleeve.

An elongated tubular rigid extension pole is provided. The pole has a closed upper end with a threaded axial bore formed thereon and a lower end slidably inserted into the sleeve in axial alignment therewith and in contact with the upper end of the spring. The extension pole is telescopically adjustable with respect to the stand at a set elevation by tightening of the nut.

A ball and socket joint assembly is included and has a rigid upper portion with a threaded bolt extended therefrom and threadably secured within the bore of a handle of the hair dryer, a rigid lower portion having a threaded bolt extended therefrom and threadably secured within the bore of the upper end of the extension pole, and a beveled and generally cylindrical rubber boot secured around the portions. The boot has an upper end coupled to the handle and a lower end coupled to the extension pole. The joint assembly thereby allows pivotal movement of the hair dryer with respect to the stand and extension pole for allowing manual positioning of the nozzle for directing heated air from the hair dryer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telescoping stand with pivotable holder for a hand-held hair dryer which has all the advantages of the prior art hair drying stands and none of the disadvantages.

It is another object of the present invention to provide a new and improved telescoping stand with pivotable holder for a hand-held hair dryer which may be easily and efficiently manufactured and marketed.

It is a further object of the present invention to provide a new and improved telescoping stand with pivotable holder for a hand-held hair dryer which is of durable and reliable construction.

An even further object of the present invention is to provide a new and improved telescoping stand with pivotable holder for a hand-held hair dryer which is susceptible of a low cost of manufacture with regard to both materials and labor, and which accordingly is then susceptible of low prices of sale to the consuming public, thereby making such a telescoping stand with pivotable holder for a hand-held hair dryer economically available to the buying public.

Still yet another object of the present invention is to provide a new and improved telescoping stand with pivotable holder for a hand-held hair dryer which provides in the apparatuses and methods of the prior art some of the advantages thereof, while simultaneously overcoming some of the disadvantages normally associated therewith.

Even still another object of the present invention is to provide a new and improved telescoping stand with pivotable holder for a hand-held hair dryer for holding a hand-held hair dryer at a elevation and angle that allows for optimal drying of a person's hair.

Lastly, it is an object of the present invention to provide a new and improved telescoping stand with pivotable holder for a hand-held hair dryer comprising a stand having a base and a manually and telescopically adjustable pole extending therefrom and terminated at a free end; and coupling means secured to the free end of the pole for removably holding a hand-held hair dryer and allowing it to be positioned at different angles for use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded view of a top section of the present stand.

FIG. 4 is a cross-sectional view of the coupling of the stand with a hand-held hair dryer.

The same reference numerals refer to the same parts through the various Figures.

DESCRIPTION OF THE PREFERRED EMBODIMENT

Figure 1:
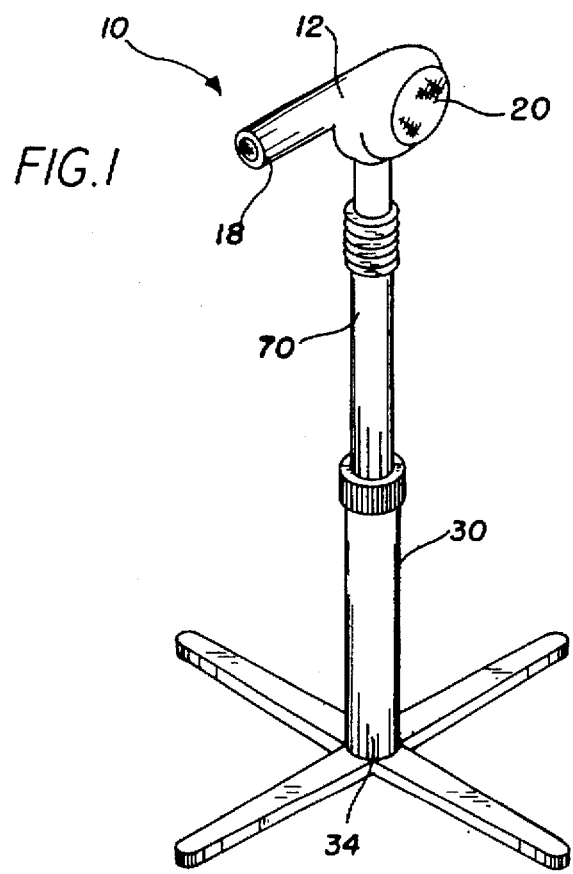
FIG. 1 is a perspective view of the preferred embodiment constructed in accordance with the principles of the present invention.
Figure 2:
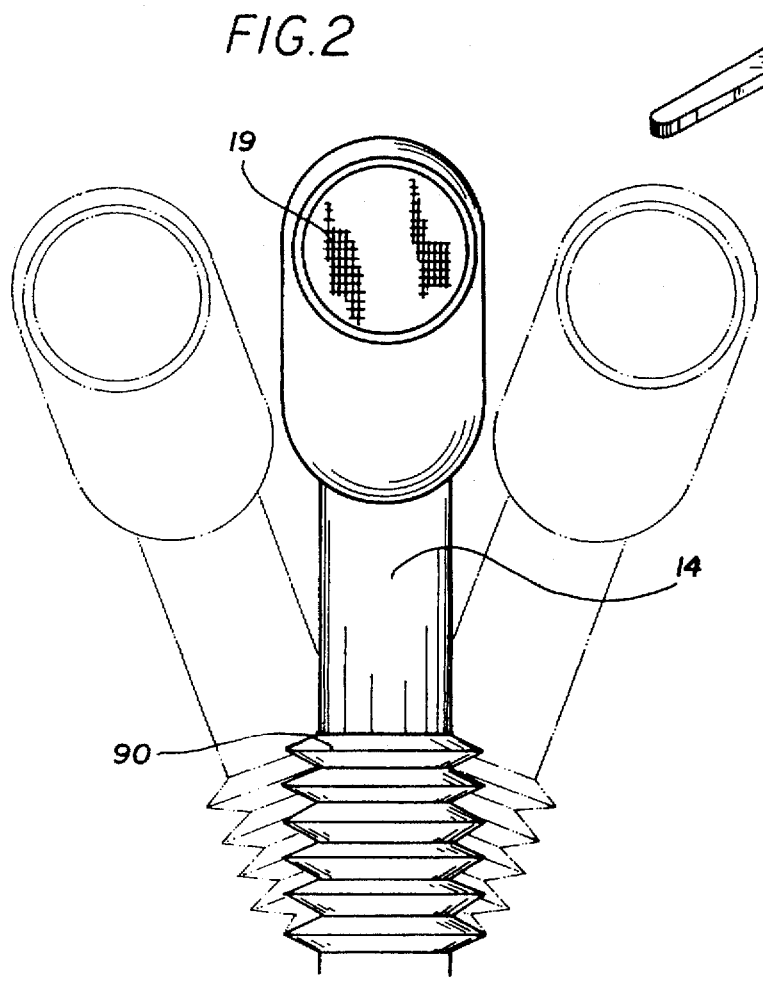
FIG. 2 is a side-elevational view depicting the pivotable motion of the top end of the present invention.

With reference now to the drawings, and in particular, to FIG. 1 thereof, the preferred embodiment of the new and improved telescoping stand with pivotable holder for a hand-held hair dryer embodying the principles and concepts of the present invention and generally designated by the reference number 10 will be described.

The preferred embodiment of the present invention is comprised of a plurality of components. In their broadest context, such components include a hand-held hair dryer, stand, extension pole, and ball and socket joint assembly. Such components are individually configured and correlated with respect to each other to allow for the optimal positioning of the hair dryer at an angle and elevation for drying a person's hair.

Specifically, the present invention includes a hand-held electric hair dryer 12. The electric hair dryer has a handle 14 with a threaded axial bore 16 formed thereon. The hair dryer also has an output nozzle 18 sealed with a steel wire mesh 19. The hand-held hair dryer is actuated through an electrical blower-heater assembly mechanism 20 that is conventional in design. The blower-heater assembly discharges heated air through the output nozzle 18 for drying hair. The blower-heater assembly is electrically actuated through common household power.

Also provided is a rigid metal or plastic stand 30. The stand is formed of a tubular and upwardly extending sleeve 32. Sleeve 32 has a smooth outer surface, a central axis, a closed lower end 34, and a threaded open end 36. A rectangular slot 38 is formed on the threaded opened end. A nut 40 is threadably secured to the open end 36. The nut has spaced ribs 42 formed thereon for allowing a user a firm grip. By tightening the nut, the diameter of the open end is decreased. The stand also has an elongated helical metal spring 44. The spring has an upper end 46 and a lower end 48. The spring 44 is inserted within the sleeve at a position in axial alignment therewith. In this position, the lower end of the spring is placed in contact with the lower end of the sleeve.

Also included is a rigid metal or plastic base 50. The base is coupled to the lower end of the stand. The base includes a tubular mount 52 with an integral threaded bore 54 formed thereon. Furthermore, the base has four elongated legs 56 extending radially outwards from the mount 52 or sleeve. Each leg is generally positioned at an angle perpendicular to the adjacent legs. The legs are terminated at free ends 58 that are contained in a common plane that is positioned perpendicular to the central axis of the sleeve to allow the sleeve to be placed in an upwardly extending position when the legs are placed on a flat surface. The lower end of the sleeve is placed in the mount and secured with a bolt 60 disposed through the bore 54.

To allow for elevation adjustments, an elongated tubular rigid plastic or metal extension pole 70 is included. The extension pole has a closed upper end 72 with a threaded axial bore 74 formed thereon. The extension pole 70 also has a lower end that is slidably inserted into the sleeve and positioned in axial alignment therewith. The extension pole is placed in contact with the upper end 46 of the spring. The spring urges the extension pole upwards. The extension pole is telescopically adjustable with respect to the stand at a set elevation by tightening of the nut 40. When the nut is tightened, the diameter of the open end of the sleeve 32 is decreased and grips the extension pole to preclude its movement.

To allow for pivotal adjustment of the hair dryer 12, a ball and socket assembly 80 is provided. The assembly 80 has a rigid upper portion 82 with a threaded bolt 84 extended therefrom and threadably secured within the bore 16 of the handle of the hair dryer. The assembly 80 also has a rigid lower portion 86. The lower portion 86 has a threaded bolt 88 extended therefrom and threadably secured within the bore 74 of the upper end of the extension pole. Furthermore, the joint assembly 80 includes a beveled and generally cylindrical rubber boot 90. The boot is secured around the portions 82, 86. The boot has an upper free end 92 that is coupled to the handle through a slot 94. The boot also has a lower end 96 that is coupled to a slot 98 on the extension pole 70 in a similar fashion. In this configuration, the sleeve may be removed for allowing lubrication or replacement of the joint assembly 80. The joint assembly thus allows pivotal movement of the hair dryer 12 with respect to the stand 30 and extension pole 74, thereby permitting manual positioning of the nozzle of the hair dryer for directing heated air to a person's head. In addition, the boot of the joint assembly 80 also prevents direct contact with the portions 82, 86 to thereby preclude an injury to a user.

Figure 5:
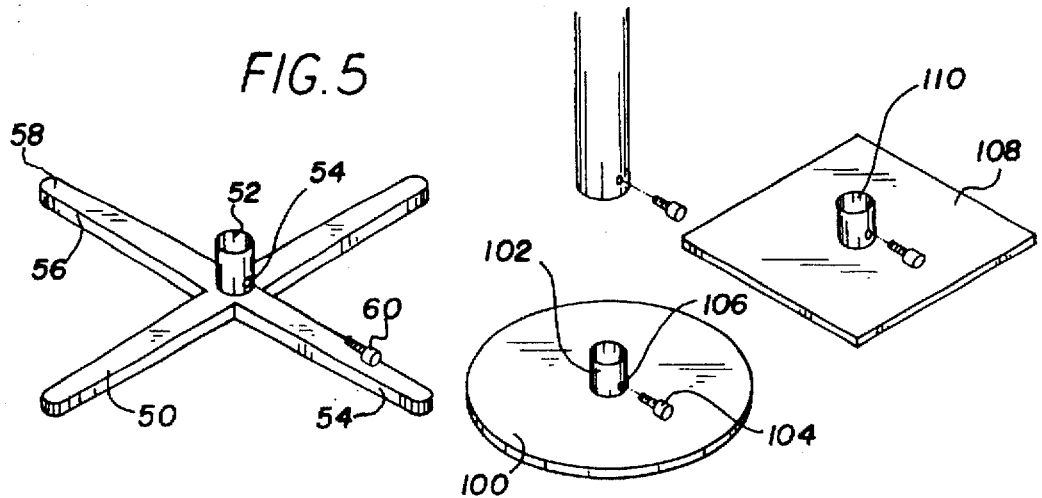
FIG. 5 is a perspective view depicting alternate embodiments of the base that may be utilized with the present invention.

Alternate embodiments of the base of the stand are shown in FIG. 5. The base of the stand can be formed of a circular planar rigid disk 100 and tubular mount 102. The lower end of the pole 70 is secured to the mount with a bolt 104 extended through threaded bore 106. The base of the stand can also be formed of a planar rigid square or rectangular plate 108 with integral mount 110 and affixed to the pole as previously described.

Figure 6:
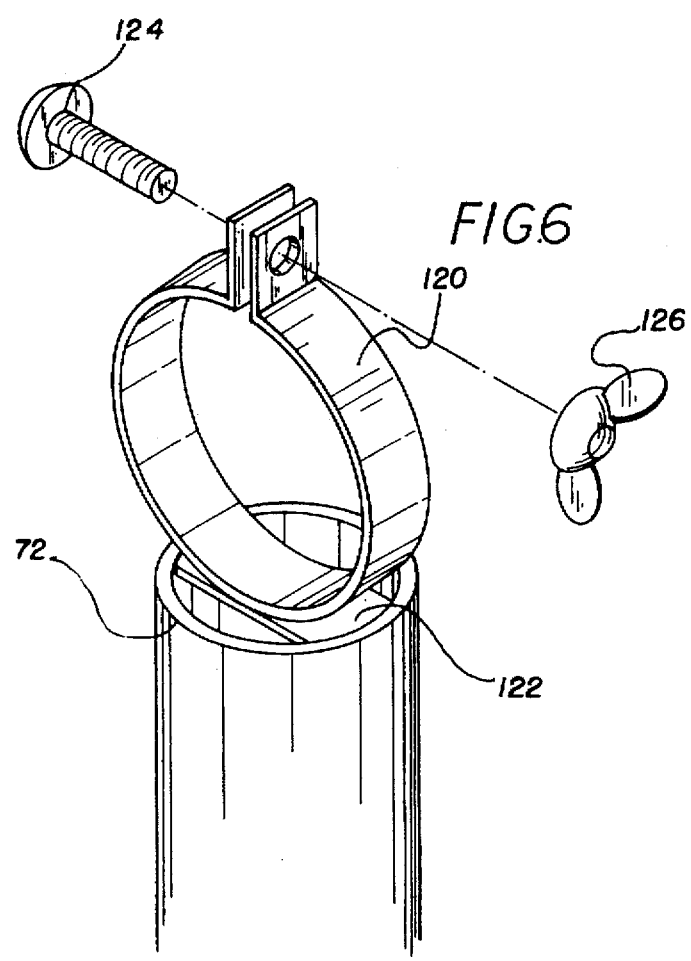
FIG. 6 is a perspective view of a top end an alternate embodiment of the present invention for holding a conventional and commercially available hand-held hair dryer.

Yet another embodiment of the present invention includes an adjustable metal or plastic clamp as shown in FIG. 6. The clamp is shaped in the form of a ring 120. The clamp is fixed to the upper end 72 of the extension pole with an integral strip 122. The clamp 120 is used for holding a separate conventional hand-held hair dryer. The clamp is adjustable via a bolt 124 and wing nut 126. Therefore, by using this embodiment of the present invention, a conventional hand-held hair dryer can be employed by a user.

The present invention can be mounted from the ceiling, on a wall, or on a floor. The hair dryer is mounted on an adjustable stand and pole which allows it to be adjusted at various angles and elevations. The hair dryer can be formed with sizes and shapes based on commercially available designs. The present invention can also be designed to accommodate a special hair dryer as shown in FIG. 1. The stand and extension pole of the present invention is made of conventional material such as plastic or metal. The present invention allows a person to keep his or her hands free for styling while the pivotable dryer assembly allows optimal positioning for drying the hair. The present invention can be used by anyone, especially women, handicapped people, injured people, beauticians, and the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A telescoping stand comprising:

a stand having a base and a manually and telescopically adjustable pole extending therefrom and terminated at a free end, the stand having a tubular upwardly extending sleeve, a closed lower end, a threaded open end and a nut threadably secured therearound, and a lower end, the base is formed of a plurality of legs being coupled to the lower end of the stand; and a ball and socket joint assembly secured to the free end of the pole for removably holding a hand-held hair dryer and allowing it to be positioned at different angles for use.

2. A telescoping and pivotable hair dryer assembly comprising, in combination:

a hand-held hair dryer having a handle with a threaded bore formed thereon, an output nozzle, and an electrical blower-heater assembly means therebetween for discharging heated air through the output nozzle for drying hair when electrically actuated;

a rigid stand formed of a tubular upwardly extending sleeve having a central axis, a closed lower end, a threaded open end with a slot formed thereon and a nut threadably secured therearound whereby tightening the nut decreases the diameter of the open end, an elongated helical spring having an upper end and a lower end and with the spring inserted within the sleeve and in axial alignment therewith such that the lower end of the spring is placed in contact with the lower end of the sleeve, a rigid base coupled to the lower end of the stand wherein the base is formed of four elongated legs extending radially outwards from the sleeve with each leg generally positioned at an angle perpendicular to the adjacent legs and wherein the legs are terminated at free ends contained in a common plane that is positioned perpendicular to the central axis of the sleeve;

an elongated tubular rigid extension pole having a closed upper end with a threaded axial bore formed thereon, a lower end slidably inserted into the sleeve in axial alignment therewith and in contact with the upper end of the spring and with the extension pole being telescopically adjustable with respect to the stand at a set elevation by tightening of the nut; and a ball and socket joint assembly having a rigid upper portion with a threaded bolt extended therefrom and threadably secured within the bore of a handle of the hair dryer, a rigid lower portion having a threaded bolt extended therefrom and threadably secured within the bore of the upper end of the extension pole, and a beveled and generally cylindrical rubber boot secured around the portions with the boot having an upper end coupled to the handle and a lower end coupled to the extension pole, and with the joint assembly thereby allowing pivotal movement of the hair dryer with respect to the stand and extension pole for allowing manual positioning of the nozzle for directing heated air from the hair dryer.

* * * * *